Feb. 22, 1927.  I. H. KENDALL  1,618,882
CLOSURE DEVICE
Filed Aug. 8, 1923
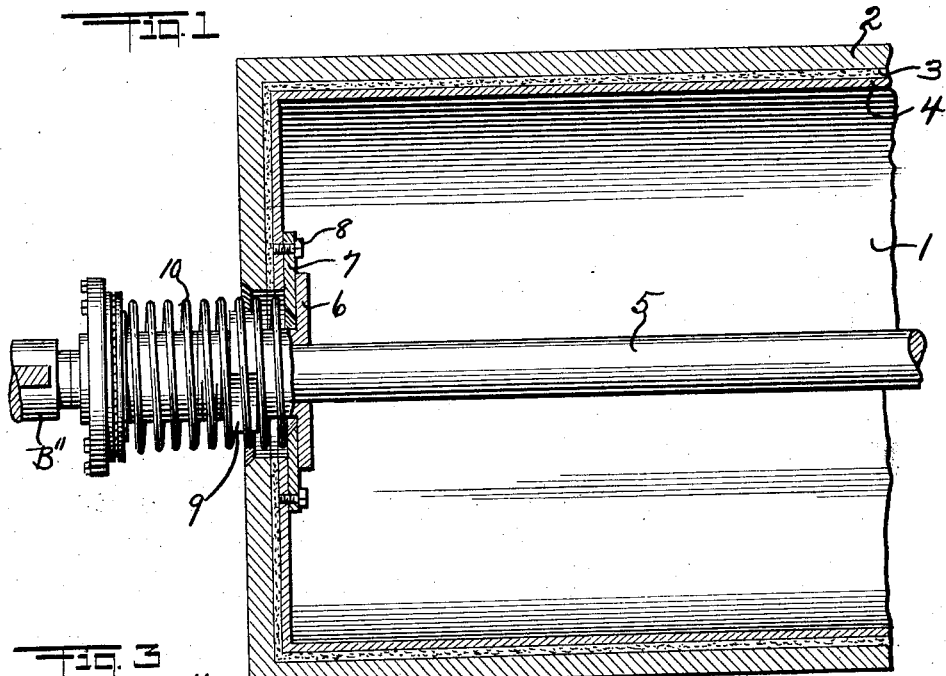
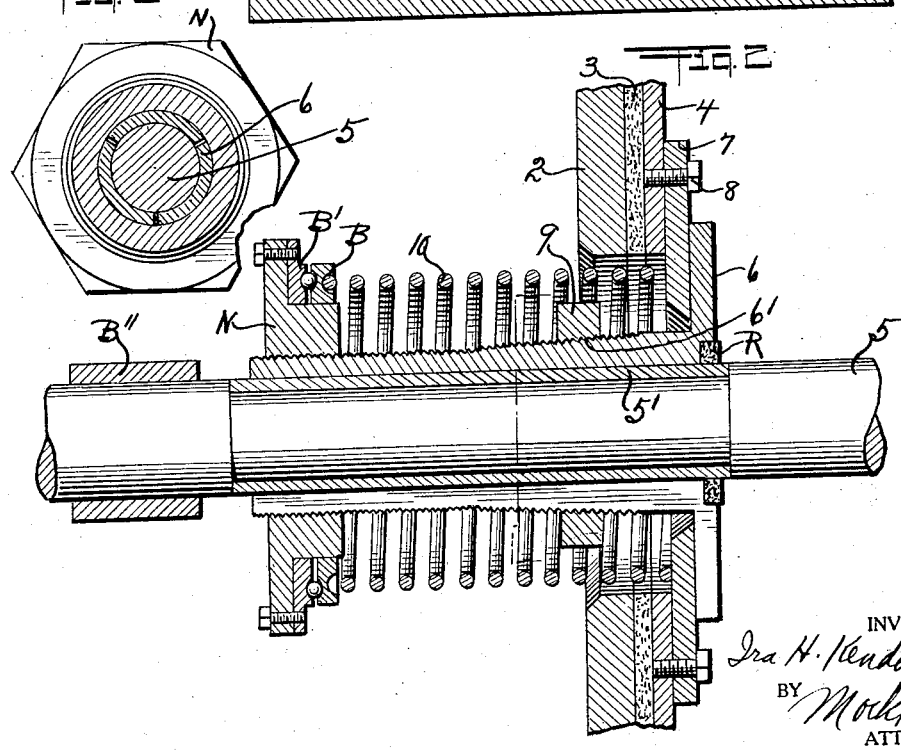
INVENTOR
Ira H. Kendall
BY
ATTORNEYS Patented Feb. 22, 1927.

1,618,882

UNITED STATES PATENT OFFICE.

IRA H. KENDALL, OF POTSDAM, NEW YORK.

CLOSURE DEVICE.

Application filed August 8, 1923. Serial No. 656,363.

My invention relates to a new and improved closure for agitating devices.

One of the objects of my invention is to provide a new and improved closure for the shafts upon which agitating devices are mounted for agitating milk contained in closed tanks.

Another object of my invention is to provide a closure for such shafts which shall be simple to construct, sanitary in operation, and easy to inspect.

Another object of my invention is to provide a device of this character which can be readily assembled and taken apart.

Other objects of my invention will be set forth in the following description and drawings which diagrammatically illustrate the principle of operation of my invention, it being understood that the parts are not drawn to scale and that numerous minor mechanical changes and additions could be made without departing from the spirit of my invention.

Fig. 1 is a central section.

Fig. 2 is a detail section.

Fig. 3 is an end view of Fig. 2, partially in section.

The closed tank 1 in which the milk is kept while it is being agitated has an outside wall 2 made of wood or some other suitable stiff material. The wooden wall 2 has the usual lining 3 made of flexible insulating material, such as felt or the like, and an inner lining 4 made of copper, which is also quite flexible, and is preferably quite thin, about one-sixteenth of an inch thick. The details of construction of said tanks are old and well known and are therefore not illustrated.

An annular plate 7 is connected to the flexible copper lining 4 by any suitable means, such as by brazing, soldering or by removable bolts or rivets 8. Any suitable form of fastening device could be substituted for the bolts 8 and it is obvious that since the copper lining 4 is relatively flexible and since the plate 7, which may be called the closure plate, is not connected to the rigid outer wall 2, the said closure plate 7 has a certain relative movement with respect to the outer wall 2. The shaft 5, upon which any suitable beaters or agitators may be located, has a series of bushing members 6 adapted to be connected thereto. As shown in Fig. 3, each bushing member 6 extends over one-third of the circumference of the sleeve 5'. The shaft 5 has a sleeve 5' at the region adjacent to the bushing members, so that this sleeve and the inside of the bushings can be made to fit very tightly. Hence, when the bushing members 6 are locked in position, as will be hereinafter described, a continuous liquid-tight closure is effected against the sleeve 5'.

As clearly shown in Fig. 2, the bushing members 6 each have an annular portion inside the tank, which may be called the tank portion, and an outer portion, the interior of said outer portion having a cylindrical contour and the exterior thereof having a conical contour. The interior cylindrical portion of each said bushing section 6 is smooth and the outer part thereof is threaded, as shown at 6'. A nut 9 having its interior of a conical contour can be employed for tightly pressing the bushing sections 6 against the shaft 5 and for holding them firmly in place, so that the bushing members and sleeve 5' and shaft 5 revolve in unison, but it is not departing from the spirit of my invention if the shaft can revolve with a certain slip relative to the bushing. The closure plate 7 and the bushing sections 6 are ground at the places where they contact so as to provide a very close and liquid-tight fit so that any escape of liquid can be prevented.

Of course, the adjacent portions of the closure plate 7 and of each bushing section 6 have the same contour. When the parts are assembled, the bushing members 6 are preferably forced so firmly in a direction against the adjacent stiff wall of the tank, that the felt lining is compressed, and the bushing sections are locked in this position so as to secure an initial tight fit against the closure plate 7.

Compressing spring 10 can be provided if desired, so as to firmly press the closure plate 7 against the tank annular portions of the bushing sections 6. This spring 10 has its outer end connected to one-half B of an end-thrust ball-bearing which is maintained stationary while the shaft revolves by any suitable detachable connection to any suitable support. The other half B' of said bearing is in contact with or it may be connected to a nut N mounted on the bushing so as to revolve with the shaft 5, or else have a certain slip with respect to said shaft, as before mentioned. This construction enables the spring 10 to firmly force the closure plate 7 against the annular part of the bushing, so that the hydrostatic pressure of the milk cannot separate the closure plate from the bushing. These bushing sections 6 preferably have a liquid-tight fit with respect to each other. The slight circumferential or lateral spaces between them shown in Fig. 3 is only for clearly illustrating the parts.

The shaft 5 is preferably held in a bearing B'' which is external to the tank 1 and it is obvious that this shaft can be oiled, inspected and taken care of in the ordinary manner without interfering with the sanitary operation of the device.

The operation of my device is as follows:—

When the shaft 5 is revolved it is firmly supported in the bearing B''. Of course it is obvious that the structure shown at the left hand side of Fig. 1 may be duplicated at the right hand side thereof so that the shaft 5 is firmly supported in substantial bearings located outside of the tank so that the shaft 5 can be efficiently revolved.

The escape of the milk is prevented by reason of the fact that the tank annular portions of the bushing sections 6 are caused to firmly press against the smooth ground surface of the rigid closure disc 7. The springs 10 further aid in keeping the plate 7 and the annular portions of the bushing 6 firmly in contact so that a liquid-tight fit is secured.

Any escape of the milk between the shaft and the sections 6 is prevented by the tight fit secured by the sleeve 5'. Even if the shaft has a slight longitudinal movement or slips with respect to the bushing, the space between the bushing and sleeve 5' is so slight that the milk does not escape.

I have described a preferred embodiment of my invention but it is clear that numerous changes and omissions could be made without departing from its spirit.

If the closure plate 7 is connected to the copper lining 4, by soldering, brazing, or the like, then the device is absolutely sanitary because there are no projecting parts upon which dirt might collect, or which it would be difficult to clean.

The closure plate 7 is preferably made rigid.

A packing ring R may be forced into the position shown in Fig. 2, and any suitable packing may be used at this point.

If it is desired to clean the device it is only necessary to remove the nut N and the associated bearing members B and B' and the spring 10, and to then remove the holding nut 9. It is then possible to remove the bushing sections 6 and move them into the inside of the tank 1, so that all the parts are separated, and can be thoroughly cleaned and replaced.

The fastening members 8 may be made without any parts projecting inwardly into the tank, by any well-known construction, so as to facilitate the cleansing of the parts. The bushing sections may have their exteriors unthreaded save at the places where the nuts are mounted.

I claim:—

1. In a device for an agitating shaft projecting through an opening in the wall of a tank having a rigid outer wall and a bendable lining, the combination of a main bearing for said shaft external to said tank, a closure plate connected to said bendable lining, and complemental closure means connected to said shaft and contacting with said closure plate to close said opening.

2. A device according to claim 1 in which said shaft projects through said closure plate and said complemental closure means.

3. In a bearing device for an agitating shaft projecting through an opening in the composite wall of a tank having a rigid outer wall member, a compressible lining adjacent said outer wall member and a bendable lining adapted to have a limited relative movement with respect to said outer wall member, the combination of a main bearing for said shaft external to said tank, a closure plate connected to said bendable lining and complemental closure means connected to said shaft and contacting said closure plate to close said opening, said complemental closure means being forced against said plate to cause the compression of said compressible lining.

4. A device according to claim 1 having a compression spring, one end of said spring bearing against the closure plate, the other end of said spring being supported external to said tank.

5. A device according to claim 1 in which said shaft has a thrust member external to said tank and adapted to remain stationary during the revolution of said shaft, said thrust member having one end of a compression spring abutting against it, the other end of said compressing spring bearing against said closure plate.

6. In a bearing device for an agitating shaft projecting through an opening in the wall of a tank, the combination of a main bearing for said shaft external to said tank, a closure plate connected to said tank adjacent said opening, a plurality of bushing sections mounted on said shaft, each said bushing section having an inner annular part adapted to contact with said closure plate, each said bushing section having an outer portion adapted to fit against the adjacent portion of the shaft, and means external to said tank and adapted to hold said bushing sections in position on said shaft.

In testimony whereof I hereunto affix my signature.

IRA H. KENDALL.